United States Patent [19]
Kobold

[11] Patent Number: 4,827,092
[45] Date of Patent: May 2, 1989

[54] FLOW MONITOR WITH NON-ROTATABLE MOUNTING

[76] Inventor: Klaus Kobold, Sodener Strasse 120, 6233 Kelkheim, Fed. Rep. of Germany

[21] Appl. No.: 132,884

[22] Filed: Dec. 9, 1987

[30] Foreign Application Priority Data

Dec. 9, 1986 [DE] Fed. Rep. of Germany ... 8632832[U]

[51] Int. Cl.$^4$ .......................................... H01H 35/40
[52] U.S. Cl. ........................ 200/81.9 M; 73/861.74; 340/610
[58] Field of Search .............. 73/861.74 X, 861.75, 73/861.76, 186; 200/61.04, 81 R, 81.9 R, 81.9 M, 82 E; 307/118; 335/205, 206, 207; 340/606, 610 X

[56] References Cited

U.S. PATENT DOCUMENTS

| | | | |
|---|---|---|---|
| 2,600,309 | 6/1952 | MacDonald | 200/81.9 M |
| 2,943,486 | 7/1960 | Osgood | 73/861.74 |
| 3,368,045 | 2/1968 | Huper | 200/81.9 M |
| 4,074,097 | 2/1978 | Hutchinson | 73/861.76 |
| 4,282,413 | 8/1981 | Simons | 200/81.9 M |
| 4,377,090 | 3/1983 | Seulen | |

FOREIGN PATENT DOCUMENTS

| | | |
|---|---|---|
| 2744901 | 4/1979 | Fed. Rep. of Germany ................. 200/81.9 M |
| 2926811 | 1/1981 | Fed. Rep. of Germany . |
| 3317923 | 11/1983 | Fed. Rep. of Germany . |

*Primary Examiner*—Gerald P. Tolin
*Attorney, Agent, or Firm*—Wenderoth, Lind & Ponack

[57] ABSTRACT

A flow meter or monitor arranged on a conduit section through which a medium to be monitored flows includes an actuating element extending through an opening in a wall of the conduit section, with a flow pressure plate of the actuating element positioned in the flow path of the medium. The actuating element is mounted on a support plate and is deflectable against the force of a spring with a deflectable outer end projecting into a housing positioned outwardly of the opening in the conduit section. The housing may be detached from the conduit section. The end of the actuating element projecting into the housing is equipped with a permanent magnet to operate a reed contact switch to be in an electrical circuit when the actuating element is deflected. The switch is surrounded by a protective cover and is accommodated in a through-hole in the housing. The support plate can be detached and inserted into a recess of the housing and is prevented from rotation with respect to the housing.

17 Claims, 1 Drawing Sheet

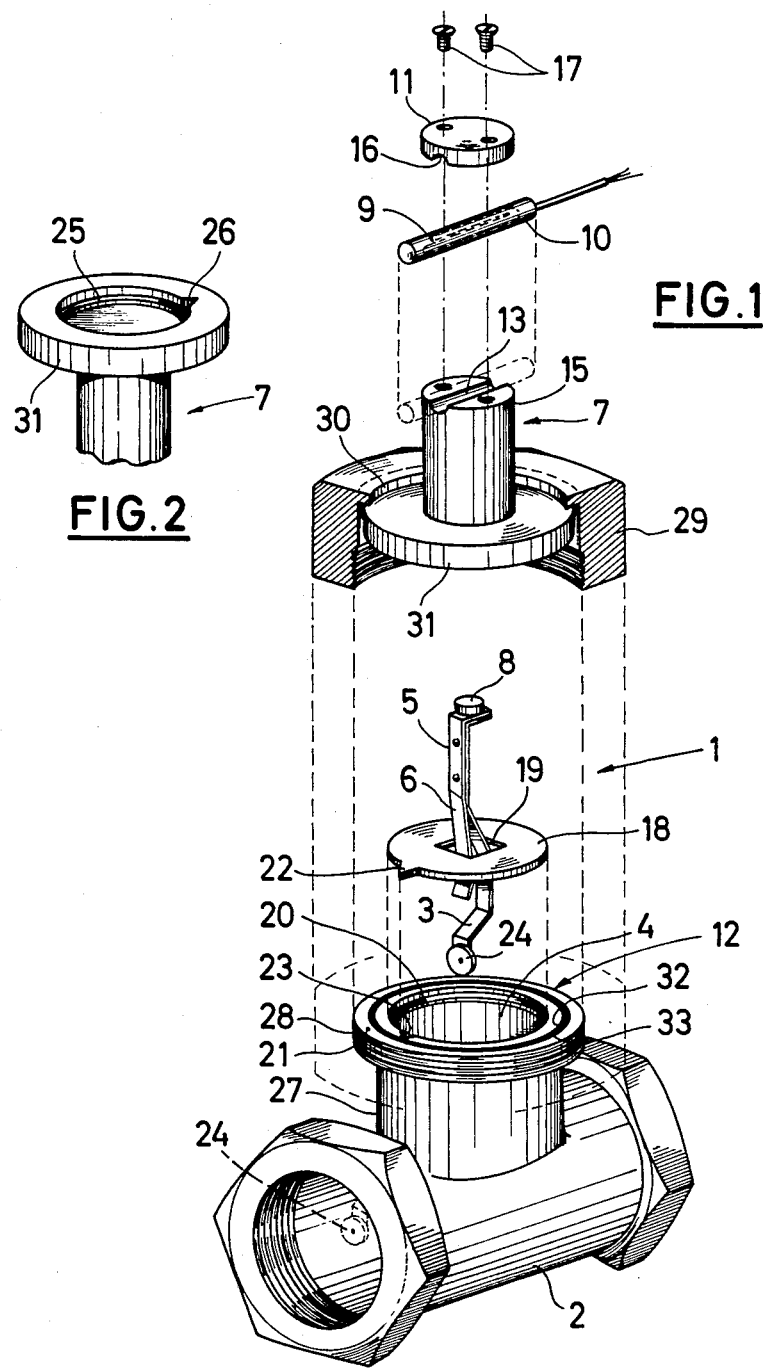

and has a flow pressure plate placed in the flow path of the medium. The actuating element is mounted on a support plate and is deflectable against the force of a spring, with a deflectable outer end projecting into a housing positioned outwardly of the opening in the conduit section. The housing may be detached from the conduit section. The end of the actuating element projecting into the housing is equipped with a permanent magnet that operates a switch, which can be of the reed contact type, in an electrical circuit when the actuating elements is deflected. The switch is surrounded by a protective cover and is accommodated in a through-hole in the housing.

FLOW MONITOR WITH NON-ROTATABLE MOUNTING

BACKGROUND OF THE INVENTION

The invention relates to a flow meter or monitor arranged on a conduit section through which a medium to be monitored is to flow. An actuating element extends through an opening in a wall of the conduit section and has a flow pressure plate placed in the flow path of the medium. The actuating element is mounted on a support plate and is deflectable against the force of a spring, with a deflectable outer end projecting into a housing positioned outwardly of the opening in the conduit section. The housing may be detached from the conduit section. The end of the actuating element projecting into the housing is equipped with a permanent magnet that operates a switch, which can be of the reed contact type, in an electrical circuit when the actuating elements is deflected. The switch is surrounded by a protective cover and is accommodated in a through-hole in the housing.

With conventional flow monitors of this type, the actuating element, spring and housing are firmly and inseparably joined together. The actuating element is mounted on the support plate by way of a leaf spring, and the support plate sits firmly in the housing. The support plate has a small opening for the actuating element which extends through an opening in a connecting branch of the conduit section such that the flow pressure plate projects into the flow path of the medium to be monitored in the interior of the conduit. The connection between the housing and the conduit section is achieved through a separable flange joint. The permanent magnet, which actuates the switch by deflection of the actuating element, is located in the inaccessible interior of the housing that is connected with the conduit section. The switch, surrounded by a protective cover and formed as a reed contact, is arranged at the outer end of the housing. For this purpose, the housing, which usually has a circular cross section, has an axial projection which is provided with a through-hole transverse to the axis of the cylindrical housing, for acceptance of a protective cover containing the switch. In order to hold the protective cover and switch in place, a screw perpendicular to the axis of the through-hole is provided. Since the medium to be monitored enters the interior of the housing when the flow monitor is in use, the parts assembled thereat are subject to contamination due to impurities carried by the medium. In particular, magnetizable particles in the medium are attracted by the effect of the permanent magnet, and the accumulation of such particles over a period of time can influence the functional capability of the system. Flow monitors need, therefore, to be cleaned from time to time. Due to the inaccessibility of parts assembled in the housing interior, however, cleaning is practically impossible. An additional disadvantage of conventional flow meters is the considerable effort involved in adjusting the position of the flow pressure plate in the flow path of the medium while assembling the system after cleaning. It has also been shown that the holding fixture for the protective cover and switch in the through-hole of the projection of the housing can damage the reed contact, due to the yielding characteristics of commercially available protective covers.

SUMMARY OF THE INVENTION

The object of this invention is to improve the practical value of a flow meter or monitor of the type described above by avoiding the aforementioned disadvantages, whereby in particular simpler maintenance and a better cleaning potential can be achieved. In addition, better access to the parts to be cleaned and a simpler assembly procedure with precise and quick positioning of the flow pressure plate in the flow path of the medium are made possible. Further, trouble-free mounting of the switch and its protective cover is achieved.

The above objects are achieved in accordance with the invention by the provision of a detachable support plate inserted into a recess in the housing in a manner such that the support plate cannot turn with respect to the housing.

As a result, by removing the housing, which is usually screwed onto the conduit section, the actuating element can be removed immediately from the housing. In this way, the end of the actuating element with the permanent magnet and projecting into the housing, even in the assembled state, as well as the housing interior, easily can be cleaned. Due to the rotation-preventing arrangement between the support plate and the housing, the actuating element is ensured of proper orientation by simple assembly when the housing is positioned with respect to the conduit section, thereby assuring correct functional capability.

It is particularly advantageous if, in addition, the support plate and/or the housing are/is prevented from rotation relative to the conduit section. The actuating element, mounted on the support plate, would then retain, even after assembly, the prescribed orientation, not only with respect to the housing, but also with respect to the conduit section.

A particularly simple and secure mounting of the detachable actuating element is possible if the support plate is braced against a collar of the end surface of the conduit section which comes into contact with the lower edge of the housing. The proper orientation of the actuating element and, in particular, the flow pressure face of the flow pressure plate projecting into the conduit section, can be particularly well secured in the support plate is supplied with a peripheral projection which engages a groove formed into the end face of the conduit section. By this means, not only is the support plate prevented from rotating, but also the desired orientation of the actuating element mounted on the support plate is assured.

Also, the same or another projection on the support plate can engage a slot or recess in the lower edge of the housing, so that the rotation of the actuating element with respect to the housing and the switch positively is prevented, while enabling simple assembly and disassembly.

In this connection, the invention proposes that the slot and the support plate projection be so arranged that the surface of the flow pressure plate of the actuating element be located perpendicular to the flow path of the medium. In this manner, with a new assembly or reassembly after cleaning, the insertion of the support plate onto the end surface of the conduit section will automatically result in the necessary adjustment of the optimum position of the flow pressure plate with respect to the direction of flow.

An additional favorable feature of the invention is that the slot of the housing is so arranged that the permanent magnet, mounted on the end of the actuating element projecting into the housing, is properly situated in the effective region of the switch. For the solution of this problem, the support plate fits in only one orientation between the collar provided on the end surface of the conduit section and a collar formed on the inner side of the lower edge of the housing, so that assembly substantially free of play is possible.

Furthermore, the end face of the conduit section is formed by a flange projecting radially outwardly from the conduit and having a peripheral screw thread over which is threaded an internally threaded cap having a collar abutting the outer side of a flange extending from an inner end of the housing. This arrangement provides essentially a preferably disc-shaped support plate clamped between the flange of the housing and the flange of the conduit section. In this way, the support plate is fixed when the housing is screwed onto the conduit section. The flange of the conduit section can be provided in a known fashion with a peripheral groove and ring seal.

With a flow monitor by which the housing wall, joined to a flange if required, is formed essentially as a cylindrical cap which is provided with a through-hole at its outer end for acceptance of the protective cover containing the switch, there is provided, in accordance with another feature of the invention, trouble-free positioning of the switch with its protective cover by holding the same by a fastenable cover to maintain the through-holl free. This can most appropriately be realized by providing that the through-hole for acceptance of the protective cover of the switch is formed by recesses in the end of the housing and in the cover. In this way, the switch with its protective cover can be clamped over a large area between the housing and cover, without danger of damage.

Alternatively, the protective cover of the switch can be provided with a flattening of its peripheral wall in the region where its surface comes into contact with a substantially flat surface of the cover.

It is also within the scope of the invention to prevent the protective cover of the switch from rotating with respect to the cover and/or the through-hole of the housing. In this way, the switch, accommodated in the protective cover, is maintained, after assembly, in a proper orientation with respect to the permanent magnet.

The proper orientation of the switch with respect to the magnet can be best assured if the rotation-preventing mechanism is formed as a tongue and groove system.

The cover is attached to the housing preferably by means of a screw connection, with large-area clamping of the switch with its protective cover in the through-hole.

If the housing is not in the form of a cylindrical cap, but rather, for example, of a pipe section open at the outer end, the cover for clamping the switch with its protective cover and the cover itself are placed preferably tightly on the open end of the pipe, so that escape of the flowing medium is prevented.

The housing is formed of a non-magnetizable material, such as brass, synthetic material, etc.

Further objects, features, advantages and application possibilities of the invention wil become apparent from the ensuing description of one embodiment thereof, with reference to the accompanying drawings. All described and/or pictorially represented features by themselves or in any reasonable combination form the subject of the invention.

BRIEF DESCRIPTION OF THE DRAWINGS

In the drawings:

FIG. 1 is an exploded perspective view, partially in section, of the parts of one embodiment of a flow monitor according to the invention; and FIG. 2 is a perspective view of a partial section of a housing thereof, shown enlarged with respect to FIG. 1 and inverted.

DETAILED DESCRIPTION OF THE INVENTION

The embodiment of a flow monitor (1) shown in FIG. 1 includes, essentially, a conduit section (2) through which the medium to be monitored is to flow and having a lateral connecting branch (27), an actuating element (5), a cap-formed housing (7), a switch (9) formed as a reed contact and surrounded by a protective cover (10), as well as a cover (11). The conduit section (2) contains, in the connecting branch (27), an opening (4) which is surrounded by a flange (12) having exterior screw threads (28). The top face (21) of the flange (12) has formed therein an axial recess defining a collar (20) slightly spaced axially of face 21 and on which a support plate (18) bearing the actuating element (5) is seated in the assembled state. A radial projection (22) on the outer edge of the support plate (18) engages within a suitably formed radial groove (23) in the top face (21) of the flange (12).

The support plate (18) is provided with an opening (19) for the actuating element (5) that has at its upper end a permanent magnet (8) and that at its lower end becomes a flow pressure plate (3) equipped with a flow pressure face (24). Actuating element (5) is deflectable and is held in a centered position by a leaf spring (6) which is joined to the support plate (18) on the interior wall of the opening (19). When the support plate (18) sits on the collar (20) formed in the top face (21), the flow pressure plate 3 of actuating element (5) projects into the interior of the conduit section (2) in a position such that, due to the projection (22) on the support plate (18) engaging the groove (23), the flow pressure face (24) is automatically aligned perpendicularly to the flow path of the medium. This fixed position is retained even with the subsequent connection of the housing (7) onto the conduit section (2).

The connection between the cylindrical housing (7) and the conduit section (2) is effected by a cap (29) that has an inwardly extending collar (30) rotatably contacting the outer surface of a flange (31) extending outwardly from the inner end of the housing (7), and that has internal threads that can be screwed onto the screw threads (28). In order to achieve a gas-and/or-liquid seal between the flanges (12) and (31) the top face (21) of the flange (12) is provided with an annular groove (32) into which fits a sealing ring (33). As is apparent from FIG. 2, the inner face of the flange (31) of the housing (7) has therein an axial recess defining a collar (25) that comes into contact with the upper face of the support plate (18), and a radial groove (26) for receipt of the projection (22) of the support plate (18). Thus, in the assembled state the support plate (18) is positioned between and contacts collars (20), (25) and projection (22) extends into radial grooves (23), (26). This achieves, simultaneously with assembly, an orientation of the housing (7) such that channel-shaped recess (13) at its upper end extends in a particular direction to orient the switch (9) with regard to the effective region of the permanent magnet (8).

As a result of the invention, a flow monitor is created having good accessibility for maintaining and cleaning parts having a tendency towards dirt accumulation, as well as automatic positioning of the flow pressure plate (3) and its flow pressure face (24) in the flow path of the medium, and allows at the same time an alignment of the switch (9) with the effective region of the permanent magnet (8) during assembly. The switch can be mounted without difficulty.

The recess (13) is formed on an extension of the cylindrical housing wall (15) of the cap-shaped housing (7). In the assembled state, the protecive cover (10) formed as a sleeve and containing the switch (9) is positioned in the recess (13) in the embodiment shown.

The cover (11) is provided at its lower end with a channel-shaped recess (16) corresponding to the recess (13). When the cover (11) is screwed onto the housing (7) by means of screws (27), the two recesses (13) and (16) form a through-hole for receiving and for achieving large-area clamping of switch (9) with protective cover (10).

I claim:

1. In a flow monitor arranged on a conduit section through which a medium to be monitored is to flow, and comprising an actuating element extending through an opening in a wall of said conduit section with a flow pressure plate of said actuating element placed in the flow path of the medium, said actuating element being mounted on a support plate and being deflectable against the force of a spring with a deflectable outer end projecting into a housing positioned outwardly of said opening in said conduit section, said housing being detachably connected to said conduit section, said end of said actuating element projecting into said housing having a permanent magnet for operating a switch of the reed contact type to be in an electrical circuit when said actuating element is deflected, said switch being surrounded by a protective cover accommodated in a through-hole in said housing, the improvement comprising:

said support plate having non-threaded means detachably mounted in a groove in said housing for preventing said support plate from rotating with respect to said housing.

2. The improvement according to claim 1, further comprising means for preventing said support plate and/or said housing from rotating with respect to said conduit section.

3. The improvement according to claim 2, wherein said support plate is supported by a collar on an outer face of said conduit section that contacts an inner end of said housing.

4. The improvement according to claim 3, wherein said preventing means comprises a peripheral projection extending from said support plate and engaging a groove in said outer face of said conduit section.

5. The improvement according to claim 4, wherein said projection of said support plate also engages in said groove of said housing, said housing groove being formed in a lower edge of said housing.

6. The improvement according to claim 4, wherein said groove in said conduit section and said projection of said support plate are oriented to ensure that said flow pressure plate of said actuating element is oriented with a flow pressure face thereof extending perpendicular to the flow path of the medium.

7. The improvement according to claim 5, wherein said groove of said housing is oriented to ensure that said permanent magnet on said end of said actuating element projecting into said housing is properly situated in an actuating region of said switch.

8. The improvement according to claim 3, wherein said support plate is substantially form-fitted between said collar on said outer face of said conduit section and a collar on an inner end of said housing.

9. The improvement according to claim 3, wherein said outer face of said conduit section is formed by a radially outwardly projecting flange having external screw threads, and further comprising and internally thread screw cap threaded to said flange, said screw cap having a collar engaging an outer side of a flange extending from an inner end of said housing, and said support plate preferably is disc-shaped and is clamped between said flange of said housing and said flange of said conduit section.

10. The improvement according to claim 9, wherein said flange of said conduit section has therein an annular groove receiving a sealing ring.

11. The improvement according to claim 1, wherein said housing is formed as a cylindrical member provided at an outer end thereof with means for receiving said protective cover containing said switch, and further comprising a fastenable cover holding said protective cover and said switch on said housing.

12. The improvement according to claim 11, wherein said receiving means comprises recesses formed in said outer end of said housing and in said cover.

13. The improvement according to claim 11, wherein said protective cover of said switch has a flattened portion in its peripheral wall in contact with a substantially flat surface of said fastenable cover.

14. The improvement according to claim 11, further comprising means for preventing rotation of said protective cover with respect to said fastenable cover and/or said housing.

15. The improvement according to claim 14, wherein said means comprises a tongue and groove system formed between said protective cover and said fastenable cover and/or said housing.

16. The improvement according to claim 11, wherein said fastenable cover is mounted on said housing by a screw connection.

17. The improvement according to claim 1, wherein at least said housing is formed of a non-magnetizable material such as brass, plastics, or similar substances.

* * * * *